United States Patent [19]

Hall

[11] 4,345,040

[45] Aug. 17, 1982

[54] STABILIZATION OF POST-CHLORINATED VINYL CHLORIDE POLYMERS BY PHOSPHATE SALTS

[75] Inventor: Dale R. Hall, Avon Lake, Ohio

[73] Assignee: The B. F. Goodrich Company, Akron, Ohio

[21] Appl. No.: 159,532

[22] Filed: Jun. 16, 1980

[51] Int. Cl.³ .............................................. C08J 9/40
[52] U.S. Cl. ........................................ 521/53; 521/85;
521/145; 525/192; 525/227; 525/83; 524/417;
524/567; 524/156
[58] Field of Search .......................... 521/53, 85, 145;
260/45.7 P

[56] References Cited

U.S. PATENT DOCUMENTS 4,170,696 10/1979 Hirohara ................................ 521/53
4,224,374 9/1980 Priest ..................................... 521/53

*Primary Examiner*—Morton Foelak
*Attorney, Agent, or Firm*—Roy P. Wymbs

[57] ABSTRACT

The invention relates to porous post-chlorinated polyvinyl chloride resins which contain or have incorporated therein a salt of phosphoric acid resulting in a substantial improvement in the thermal stability thereof during subsequent processing. The phosphate salt is added to the porous post chlorinated polymer from an aqueous solution thereof which optionally contains a surfactant, which wets the polymer particles and allows the penetration thereof by the solution. Post chlorinated polyvinyl chloride (CPVC) is the most preferred polymer or resin.

15 Claims, No Drawings

STABILIZATION OF POST-CHLORINATED VINYL CHLORIDE POLYMERS BY PHOSPHATE SALTS

BACKGROUND OF THE INVENTION

Post-chlorinated polyvinyl chloride (CPVC) is a thermoplastic resin or polymer that can be processed and formed into various useful articles by conventional techniques, such as milling, calendering, extruding, laminating, compression molding, transfer molding, and the like, but not with the ease desired in certain commercial applications, such as, for example, in pipe extrusion and calendering, unless additives or processing aids are incorporated therein to improve its stability and impact strength, as well as its processability. However, while improving processability, etc., these additives or processing aids produce other harmful effects, that is, the compositions are considerably softer, weaker and less desirable chemically and electrically than the original resin, thus limiting their field of usefulness in the manufacture of rigid plastic articles.

In general, the post chlorination of polyvinyl chloride (PVC) comprises forming a suspension of finely divided PVC particles in a major proportion of an aqueous medium which optionally contains about 5% to 25% by volume of a chlorohydrocarbon which functions as a swelling agent for the PVC particles or resin. The aqueous medium, or liquid reaction medium, is then saturated with chlorine gas at a temperature no greater than about 65° C. and then photo-illuminating the suspension to induce the chlorination reaction between the dissolved chlorine and the suspended PVC. More chlorine gas is passed into the suspension so that there is always present an excess of dissolved chlorine. The chlorination reaction is terminated when the desired amount of chlorine has been reacted with the PVC by extinguishing the photo-illumination. Such a process is described in U.S. Pat. No. 2,996,489.

The chlorination rate in the above-described processes, that is, the aqueous PVC suspension process and the same with a chlorohydrocarbon swelling agent added thereto, can be increased by adding to the PVC suspension a catalytic amount of a free radical-producing agent, such as, for example, azo compounds, peroxy compounds, peroxides, nitroso compounds, redox catalysts, and the like. Also, in U.S. Pat. No. 3,167,535 there is described a method for increasing the reaction rate of the chlorination process by adding to the PVC suspension a catalytic amount of reducing agent, such as, for example, reducing sugars, aldehydes, alkali metal sulfides, metabisulfites, bisulfites, hydrosulfites, and the like. This increased chlorination rate produces a CPVC having increased stability against heat.

CPVC made by known processes, such as described above, suffers from a further detrimental effect which detracts from its usefulness in many finishing operations. Chlorinated polyvinyl chloride is susceptible to dehydrochlorination at its melt processing temperature. This degradation adversely affects the properties of finished articles made from CPVC compounds, such as loss of impact strength. Further, this undesirable degradation reaction is accelerated by trace contamination of heavy metals, which can easily result from hydrochloric acid attack on metal processing equipment. The observed result is that CPVC degradation usually starts at the polymer melt to metal interface during processing.

A detrimental effect which detracts from the usefulness of CPVC in many finishing operations is the use of many inorganic particulate fillers in making CPVC compounds which have a detrimental effect on the impact strength thereof. Obviously, there is a great need in the art to provide a means of increasing the impact strength and thermal stability of CPVC formulations during processing.

SUMMARY OF THE INVENTION

I have unexpectedly found that by incorporation of a salt of phosphoric acid into a regular stabilized CPVC formulation, or compound, results in a very substantial improvement in the thermal stability of the formulation during subsequent processing thereof. Surprisingly, this same improvement occurs with CPVC which has become contaminated with heavy metals during the manufacture of said CPVC. The important aspect of the present invention is the manner in which the phosphoric acid salt is added to, or incorporated in, the CPVC. This is accomplished by adding the phosphoric acid salt to the CPVC from an aqueous solution thereof which optionally, contains a surfactant which wets the CPVC particles and enhances the properties of the finished product. As an example of a suitable surfactant, there may be named sodium lauryl sulfate. As a result, loss of impact strength is satisfactorily avoided.

DETAILED DESCRIPTION

The CPVC most useful in the practice of the present invention is one made by a photo-illuminating chlorination of porous particles of high molecular weight PVC (polyvinyl chloride) at a temperature equal to or below about 65° C. while suspended in an inert liquid medium such as water alone, or water containing a small amount of a volatile chloromethylene swelling or wetting agent, for example, chloroform, and maintaining an excess of dissolved chlorine in said medium throughout the reaction. The starting material is preferably one having a high molecular weight and a macro-granular form. The molecular weight of PVC is usually expressed in terms of inherent viscosity. Accordingly, to be usable in the process of the present invention, the PVC should have an inherent viscosity in the range of about 0.50 to about 1.20, said viscosity being measured in accordance with ASTM-D1243.

The macro-granular form of PVC is required to obtain the low slurry viscosity necessary for efficient agitation and to obtain low viscosity at high solids levels. It is necessary to vigorously agitate the chlorinating medium in order to facilitate chlorine solution and distribute the dissolved chlorine to each of the suspended resin particles. The term "macro-granular" means a granular resin in which essentially all of the particles are above about 10 microns in diameter. Preferably a preponderant proportion of the resin should be above about 50 microns in diameter. The coarsely-granular general-purpose grades of PVC containing particles up to 200 microns or more in diameter are satisfactory for use in the present process.

The proportion of the macro-granular PVC in the slurry-like chlorination reaction mixture may vary widely up to a total solids content of about 35% to about 45% by weight. No real lower limit on slurry solids content exists. However, for economic reasons, not less than about 5% to about 10% total solids of PVC should be employed in the chlorination reaction mixture. It should be noted that high solids levels are possible with macro-granular resins whereas extremely fine resins exhibit prohibitively high viscosities at 10% solids by weight or less. Thus, the present process has the advantage of high output for a given chlorination reactor unit volume.

After the CPVC has been made, or upon completion of the chlorination step, the polymer slurry is filtered or centrifuged to free it of the liquid phase and the filter cake thus obtained is neutralized by the addition thereto of a water-soluble alkali, such as sodium, ammonium or potassium hydroxides, carbonates, phosphates, etc. The neutralized polymer is then washed with pure water to neutrality to remove residual electrolyte. Drying of the washed cake of polymer can be carried out in various ways, such as in air or vacuum ovens, suspension dryers, and the like, employing temperatures preferably below about 75° C. The water-wetted filter cake can also be washed with alcohol or acetone to displace the absorbed water and then the alcohol-or acetone-wetted polymer dried in a vacuum oven at very moderate temperatures of about 50° C. or less.

The post-chlorinated polyvinyl chloride resins useful in the present invention should be porous and should have a density in the range of about 1.52 to about 1.61 gms./cc. at 25° C., a chlorine content of from about 64% to about 70% by weight, and a heat distortion temperature, as measured by ASTM test method D648, of from about 95° C. to about 125° C., that is, at least about 20° C. higher than the heat distortion temperatures of unchlorinated polyvinyl chloride resins or polymers. The preferred post-chlorinated polyvinyl chloride resins have densities in the range of from about 1.54 to about 1.59 gms./cc. at 25° C., a chlorine content in the range of about 65.3% to about 68.5% by weight and heat distortion temperatures of at least 100° C. Said post-chlorinated polyvinyl chloride resins are not substantially degraded when heated in the air for at least 10 minutes at 375° F. to 400° F., that is they do not turn black or dark brown in said period of time. The said resins are substantially insoluble in acetone but are soluble in tetrahydrofuran. U.S. Pat. Nos. 2,996,489 and 3,100,762 describe these post-chlorinated polyvinyl chloride resins in considerable detail and give methods for their preparation.

After the dried CPVC has been recovered, it is ready to be formulated or compounded into compositions which are useful in the processing or manufacture of piping, duct-work, tanks, utensils, appliance and electrical components, automotive parts, and other rigid articles, etc. The essence of the present invention is in the manufacture of the CPVC compound. It has been found that incorporation of a salt of phosphoric acid into a typical, stabilized CPVC formulation or compound results in a tremendous improvement in the thermal stability of the formulation or compound during subsequent processing into finished articles, without detracting from the impact strength of the same. As examples of the salts of phosphoric acid, there may be named the water-soluble alkali metal salts, such as sodium, potassium, lithium, magnesium, and the like; disodium hydrogen phosphate, the orthophosphates, such as the mono-, di-, and tri-orthophosphates of said alkali metals, wherein, in some cases, temperatures on the order of about 60° C. to about 80° C. are necessary to obtain the proper solubility of the alkali metal orthophosphates; the alkali metal polyphosphates, such as the -pyrophosphates, -tripolyphosphates, -tetrapolyphosphates, and -metaphosphates, and the like. The amount of phosphate useful in the present invention will be in the range of about 0.25 part to about 10.0 parts by weight, based on the weight of 100 parts of CPVC. It is preferred, however, to have an amount of phosphate in the range of about 0.5 part to about 4.0 parts by weight. The most preferred salts are the sodium salts of phosphoric acid and especially disodium hydrogen phosphate.

It has also been found that the same improvement is realized by the addition of salts of phosphoric acid to CPVC compounds where the CPVC therein has become contaminated with heavy metals during the manufacture thereof. It is not known why this result occurs, but it is believed that the phosphate salt functions either as a hydrochloric acid acceptor or as a heavy metal chelator, or perhaps both. The noted improvement in thermal stability in CPVC compounds by the addition of salts of phosphoric acid occurs with organo tin stabilized CPVC compounds.

A unique feature of the present invention is the method by which the phosphoric acid salt is added to the CPVC. The phosphate is added to the CPVC from an aqueous solution optionally containing a surfactant, and preferably in an evaporative mixer. When a granular phosphate is added as such to impact modified CPVC there is a reduction in the impact strength of the resulting compound. However, when adding the phosphoric acid salt to CPVC in accordance with this invention, loss of impact strength in the resulting compound is satisfactorily avoided. When an aqueous solution of the phosphate is employed it is preferable to use demineralized or distilled water. When a surfactant is used in the present process its purpose is to wet the CPVC and permit penetration of the porous CPVC particles by the phosphate solution. The useful surfactants are the anionic and nonionic surfactants. The cationic surfactants are generally not useful, since they tend to precipitate the negatively charged phosphate ions. The useful anionic surfactants are the long chain alkyl sulfates, alkyl aromatic sulfonates, sulfosuccinic acid esters, alkyl phosphates, perfluroalkyl carboxylates, and the like. The nonionic surfactants are the various ethylene oxide polyether condensates of alkoxy groups, polypropylene oxide, and sorbitan monoalkyl esters. As examples of suitable surfactants falling within the above classes, there may be named sodium lauryl sulfate, magnesium lauryl sulfate, linear polyacrylic acid, sodium alkyl naphthalene sulfonate, sodium sulfosuccinic diethyl ester, acid phosphate alcohol ethoxylate, potassium fluorinated alkyl carboxylate, alkyl phenoxy polyethoxy ethanol, condensation product of ethylene oxide with propylene oxide/propylene glycol base, polyoxyethylene sorbitan monolaurate, and the like. Normally, an amount of surfactant in the range of about 0.0005 part to about 0.005 part by weight, based on the weight of 100 parts of the solution added to the CPVC is satisfactory. It is preferred, however to employ the surfactant in the range of about 0.001 part to about 0.003 part by weight.

The CPVC polymer particles should be somewhat porous in nature in order to allow penetration of the particles by the solution of the phosphate. The higher the porosity the greater the efficiency of the present process. In order to obtain good porosity in the CPVC, the starting resin, or PVC, should have good porosity. In addition to providing the proper or desired porosity in the CPVC the porous PVC increases the chlorination efficiency in making kthe CPVC. That is, the porosity of the PVC aids in generating a homogeniously chlorinated PVC particle which in turn results in a preponderance of the 1,2-dichloroethylene structure in the product. The use of a porous polymer so greatly facilitates the diffusion of chlorine as to permit the production of the highly stable, 1,2-dichloroethylene type polymers under a wider range of operating conditions. Solid, nonporous polymers must be more highly swollen and require higher dissolved chlorine concentrations to produce acceptable products. For these reasons polyvinyl chloride resins containing from about 5% to about 65% by volume of pore space are preferred in making the CPVC for use in the present invention. The CPVC will have a porosity in the same range as above since porosity does not degenerate during the chlorination reaction. Such a porosity is satisfactory to accomplish the objectives of the present invention.

While the present invention has been described in connection with PVC and CPVC, the term "polyvinyl chloride resin" is meant to include any thermoplastic polymer produced from a monomeric mixture containing not less than about 95% by weight of vinyl chloride. Thus, copolymers of vinyl chloride with minor amounts of polymerizable monoolefinic or vinyl-type comonomers can be employed. As examples of such comonomers there may be named vinylidene chloride, vinyl acetate, methyl acrylate, styrene, acrylonitrile, methyl methacrylate, ethylene, propylene, and others. However, the homopolymer polyvinyl chloride is preferred. When copolymers are employed, they must have a molecular weight at least equivalent to those given hereinbefore for PVC.

When making compounds, or compositions, with the phosphate salt-containing post-chlorinated polyvinyl chloride resins of the present invention various materials are mixed therewith. For example, butadieneacrylonitrile rubber may be added, as well as copolymer of styrene and acrylonitrile, either singly or together. Also, conventional processing aids may be employed. It is also desirable to include in the mixture, or compound, small amounts, that is, about 1 to about 5 parts per 100 parts by weight of said compound, of the conventional compounds useful as heat and light stabilizers. Examples of such stabilizers, which are well known in the art, are the barium, cadmium, zinc, tin, and lead salts of monocarboxylic acids, and the alkyl derivatives of tin, and antimony, such as the dialkyl tin and antimony mercaptides and thiazoles, such as, for example, dibutyl tin isooctyl thioglycollate, diester tin isooctyl thioglycollate, dibutyl antimony isooctyl thioglycollate, and the like. The pigments, fillers, and lubricants, which are well known in the thermoplastics art, may also be included in the compositions or compounds.

To further illustrate the present invention, the following specific examples are given, it being understood that this is merely intended in an illustrative and not a limitative sense. In the examples, all parts and percents are by weight unless otherwise indicated.

In the examples, various tests were run on the finished CPVC compounds and the results are set forth in the examples. The tests that were run were as follows:

(1) Dynamic Thermal Stability (DTS)—DTS is the time interval, expressed in minutes, between fusion (maximum torque) and breakdown (determined by a sudden increase in torque and change in color) in a Brabender Plastic-Corder torque rheometer using a #5 roller head (Model PLV 300). The test conditions employed are about 400° F. bowl temperature, 35 rmp., and a 65 gram charge size. (2) Variable Height Impact Test (VHIT)—VHIT is the failure energy, expressed in inch-pounds per mil of thickness, at 50% confidence, of 1/16 inch sheet stock when impacted by a ½ inch diameter hemispherical tup against a 0.64 inch diameter mandrel by a 8 pound weight at variable drop height. (3) Izod Impact (Izod)—Izod is the failure energy, expressed in foot-pounds per inch of specimen width, of a 5 inch by ½ inch by ⅛ inch wide specimen when impacted in a cantilevered position according to ASTM D256-78 Method A.

EXAMPLE I

The addition procedure that was employed in this and the other examples was as follows: first, an aqueous solution of disodium hydrogen phosphate (DSP) was prepared in demineralized or distilled water at 40° C. or higher to give 10-25% total solids (on anhydrous basis). Higher solids content solutions are above the solubility limit of DSP in water at room temperature. When employed, the surfactant was added to the solution to give 0.2% by weight which was for the purpose of improving the wetting of the CPVC to be stabilized.

After preparation of the phosphate solution, a steam or hot water jacketed intensive mixer, of the Henschel type, was heated to 110° C. jacket temperature. The CPVC resin was added to the mixer and allowed to mix briefly. The primary stabilizer, such as organo tin, and the like, was then added to the mixing CPVC, along with 0.1% of sodium lauryl sulfate to coat the mixer bowl and prevent phosphate buildup. Thereafter, the following addition sequence was followed as the mix was shear heated:

| Ingredient | Addition Temperature |
| --- | --- |
| DSP Solution | 60°-80° C. |
| Lubricants | 90° C. |
| Modifiers | 110° C. |
| Fillers | 110° C. |

When the mix reached a temperature of 115° C., it was transferred to a cooler and cooled to 40° C. The mix was then melt-mixed on a 190° C. two-roll mill for 5 minutes and then sheeted off and test specimens were prepared therefrom.

A series of compounds were made using the same formulation in each with exception of the phosphate solution used and dry phosphate used. The formulation and test results are given in Table I which follows. Also included in this Example are 5 compounds made with various primary stabilizers but without phosphate the results of which are set forth in Table II below. The 5 compounds shown in Table II were also made with phosphate stabilizers added and these results are set forth in Table III below.

TABLE I

| Compound No. | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| (Ingredients are in parts) | | | | | | | | | | | | |
| CPVC* | 100 | 100 | 100 | 100 | 100 | 100 | 100 | 100 | 100 | 100 | 100 | 100 |

TABLE I-continued (Ingredients are in parts)

| | | | | | | | | | | | | |
|---|---|---|---|---|---|---|---|---|---|---|---|---|
| Dibutyl tin bis isooctyl thioglycolate (stabilizer) | 2 | 2 | 2 | 2 | 2 | 2 | 2 | 2 | 2 | 2 | 2 | 2 |
| Chlorinated polyethylene (modifier) | 6 | 6 | 6 | 6 | 6 | 6 | 6 | 6 | 6 | 6 | 6 | 6 |
| Methyl methacrylate-butadiene-styrene polymer (modifier) | 1.5 | 1.5 | 1.5 | 1.5 | 1.5 | 1.5 | 1.5 | 1.5 | 1.5 | 1.5 | 1.5 | 1.5 |
| Oxidized polyethylene (lubricant) | 1.3 | 1.3 | 1.3 | 1.3 | 1.3 | 1.3 | 1.3 | 1.3 | 1.3 | 1.3 | 1.3 | 1.3 |
| Titanium dioxide, rutile (Filler) | 7.5 | 7.5 | 7.5 | 7.5 | 7.5 | 7.5 | 7.5 | 7.5 | 7.5 | 7.5 | 7.5 | 7.5 |
| Disodium hydrogen phosphate (stabilizer) | Dry 0.5 | Dry 1 | Dry 2 | Dry 4 | Dry 8 | Wet (15%) 0.5 | Wet (15%) 1 | Wet (15%) 2 | Wet (15%) 4 | Wet (15%) 8 | Wet (15% + 0.2% SLS)** 0.5 | Wet (15% + 0.2% SLS)** 1 |

Brabender DTS - 400° F. - 35 RPM - 65 Grams

| | | | | | | | | | | | | |
|---|---|---|---|---|---|---|---|---|---|---|---|---|
| Torque-Meter-Grams | 2800 | 2950 | 2900 | 2800 | 2800 | 2850 | 2850 | 2850 | 3000 | 2800 | 2850 | 2850 |
| DTS- Minutes | 19' | 22' | 34' | 65' | 70' | 34' | 45' | 55' | 58' | 69' | 35' | 42' |
| Temperature °F. | 424 | 425 | 425 | 423 | 423 | 425 | 425 | 425 | 425 | 425 | 424 | 424 |
| Izod - ⅛ inch | 2.95 | 2.16 | 1.57 | 1.31 | 1.19 | 2.23 | 2.45 | 2.48 | 1.77 | 1.23 | 2.49 | 2.37 |
| VHIT - inch-lbs./mil. | 2.00 | 1.69 | 1.16 | 0.74 | 0.29 | 2.00 | 1.89 | 2.03 | 1.92 | 1.44 | 2.03 | 1.92 |

| Compound No. | 13 | 14 | 15 | 16 | 17 | 18 | 19 | 20 |
|---|---|---|---|---|---|---|---|---|
| CPVC* | 100 | 100 | 100 | 100 | 100 | 100 | 100 | 100 |
| Dibutyl tin bis isooctyl thioglycolate (stabilizer) | 2 | 2 | 2 | 2 | 2 | 2 | 2 | 2 |
| Chlorinated polyethylene (modifier) | 6 | 6 | 6 | 6 | 6 | 6 | 6 | 6 |
| Methyl methacrylate-butadiene-styrene polymer (modifier) | 1.5 | 1.5 | 1.5 | 1.5 | 1.5 | 1.5 | 1.5 | 1.5 |
| Oxidized polyethylene (lubricant) | 1.3 | 1.3 | 1.3 | 1.3 | 1.3 | 1.3 | 1.3 | 1.3 |
| Titanium dioxide, rutile (Filler) | 7.5 | 7.5 | 7.5 | 7.5 | 7.5 | 7.5 | 7.5 | 7.5 |
| Disodium hydrogen phosphate (stabilizer) | Wet (15% + 0.2% SLS)** 2 | Wet (15% + 0.2% SLS)** 4 | Wet (15% + 0.2% SLS) 8.0 | Wet (15% + 0.2% SLS) 0.5 | Wet (15% + 0.2% SLS) 1 | Wet (15% + 0.2% SLS) 2 | Wet (15% + 0.2% SLS) 4 | Wet (15% + 0.2% SLS) 8 |

Brabender DTS - 400° F. - 35 RPM - 65 Grams

| | | | | | | | | |
|---|---|---|---|---|---|---|---|---|
| Torque-Meter-Grams | 2850 | 2900 | 2850 | 2950 | 2850 | 3050 | 2900 | 2900 |
| DTS- Minutes | 56' | 66' | 65' | 28' | 36' | 37' | 39' | 40' |
| Temperature °F. | 425 | 425 | 426 | 425 | 424 | 426 | 427 | 428 |
| Izod - ⅛ inch | 2.02 | 1.88 | 1.50 | 2.54 | 2.35 | 1.87 | 1.44 | 1.13 |
| VHIT - inch-lbs./mil. | 1.72 | 1.53 | 1.40 | 2.15 | 2.51 | 1.81 | 1.46 | 0.75 |

*Compound No's 1-15-CPVC made per U.S. Pat. No. 2,996,489 with swelling agent.
Compound No's 16-20-CPVC made per U.S. Pat. No. 3,506,637 without swelling agent.
**Sodium lauryl sulfate The above results show the advantage of addition of the phosphate salt in solution. The phosphate salt is synergistic with the most generally recognized stabilizer systems for CPVC, such as organo-tin, antimony, calcium-zinc carboxylates, and barium-cadmium carboxylates. It should be noted that the phosphate salt is used with a primary stabilizer to assure early color stability while the phosphate salt is being dispersed.

TABLE II (Ingredients are in parts)

| Compound No. | 21 | 22 | 23 | 24 | 25 |
|---|---|---|---|---|---|
| CPVC | 100 | 100 | 100 | 100 | 100 |
| Butyl Tin Stabilizer | 2 | | | | |
| Ester Tin Stabilizer | | 2 | | | |
| Antimony Stabilizer | | | 4 | | |
| Calcium-zinc stabilizer | | | | 4 | |
| Barium-Cadmium Stabilizer | | | | | 4 |
| Chlorinated polyethylene (Modifier) | 6 | 6 | 6 | 6 | 6 |
| Methyl methacrylate-butadiene-styrene polymer (Modifier) | 1.5 | 1.5 | 1.5 | 1.5 | 1.5 |
| Oxidized polyethylene (Lubricant) | 1.3 | 1.3 | 1.3 | 1.3 | 1.3 |
| Titanium dioxide, Rutile (Filler) | 7.5 | 7.5 | 7.5 | 7.5 | 7.5 |

Brabender DTS - 400° F. - 35 RPM - 65 gms.

| | | | | | |
|---|---|---|---|---|---|
| Torque-Meter-Grams | 3050 | 3150 | 3200 | 3050 | 3000 |
| DTS-Minutes | 15½' | 12' | 6' | 13½' | 18' |
| Temperature °F. | 428 | 427 | 420 | 427 | 426 |
| Izod - ⅛" | 3.55 | 3.36 | 3.07 | 3.25 | 2.97 |
| VHIT - inch lbs./mil. | 2.05 | 2.00 | 2.32 | 1.84 | 1.56 |

TABLE III

| Compound No. | 26 | 27 | 28 | 29 | 30 |
|---|---|---|---|---|---|
| (Ingredients are in parts) | | | | | |
| CPVC | 100 | 100 | 100 | 100 | 100 |
| Butyl Tin Stabilizer | 2 | | | | |
| Ester Tin Stabilizer | | 2 | | | |
| Antimony Stabilizer | | | 4 | | |
| Calcium-zinc Stabilizer | | | | 4 | |
| Barium-Cadmium Stabilizer | | | | | 4 |
| Chlorinated polyethylene (Modifier) | 6 | 6 | 6 | 6 | 6 |
| Methyl methacrylate-butadiene-styrene polymer (Modifier) | 1.5 | 1.5 | 1.5 | 1.5 | 1.5 |
| Oxidized polyethylene (Lubricant) | 1.3 | 1.3 | 1.3 | 1.3 | 1.3 |
| Titanium dioxide, Rutile (Filler) | 7.5 | 7.5 | 7.5 | 7.5 | 7.5 |
| Disodium hydrogen phosphate (stabilizer) Wet (15% + 0.2% SLS)* | 2 | 2 | 2 | 2 | 2 |
| Brabender DTS - 400° F. - 35 rpm - 65 gms. | | | | | |
| Torque-Meter-grams | 3000 | 2900 | 2800 | 3100 | 2850 |
| DTS - minutes | 57′ | 47′ | 29′ | 21′ | 37′ |
| Temperature °F. | 427 | 429 | 430 | 430 | 427 |
| Izod - ⅛″ | 1.92 | 2.26 | 2.25 | 2.71 | 2.23 |
| VHIT - inch lbs./mil. | 1.88 | 2.18 | 1.81 | 1.45 | 1.60 |

*Sodium lauryl sulfate

By comparing the results in Tables I, II and III, it can readily be seen that the use of the phosphate salt greatly enhances the dynamic thermal stability of the CPVC.

EXAMPLE II

In this example, a series of compounds were made, using the procedure and recipe of Example I, with the exception that the aqueous disodium hydrogen phosphate solution was 2% and various surfactants were employed therewith. The Izod, VHIT, and DTS tests were made, as before, and the results were as follows:

| | Izod | VHIT | DTS |
|---|---|---|---|
| Control (2% DSP wet added) | 2.48 | 2.03 | 55 |
| +0.2% Sodium lauryl sulfate | 2.54 | 1.77 | 59 |
| +0.2% Alkyl phenoxy polyethoxy ethanol | 2.24 | 2.35 | 55 |
| +0.2% Sodium alkyl naphthalene sulfonate | 2.46 | 1.92 | 47 |
| +0.2% Acid phosphate alcohol ethoxylate | 2.03 | 2.08 | 38 |
| +0.2% Potassium fluorinated alkyl carboxylate | 2.24 | 2.24 | 59 |
| +0.2% Sodium sulfosuccinic diethyl ester, 80% | 2.13 | 2.11 | 57 |
| +0.2% Polyoxyethylene sorbitan monolaurate | 2.55 | 2.08 | 53 |
| +0.2% Condensation product of ethylene oxide with propylene oxide.propylene glycol base | 2.43 | 2.07 | 48 |

These results show the usefulness of employing an optional surfactant in the phosphate salt solution.

As can be seen from the description and examples, the present invention has the advantage of increasing the heat stability of post-chlorinated polyvinyl chloride resins by a process which is readily adapted to and handled in existing commercial facilities. Further, the so treated post chlorinated resins of the present invention can be compounded while avoiding loss of impact strength in the resulting compound. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for producing post-chlorinated polymers having increased thermal stability during processing which comprises forming an aqueous solution containing a metal salt of phosphoric acid, contacting a porous post-chlorinated vinyl chloride polymer with said solution while agitating the mixture said polymer containing from about 64% to about 70% by weight of chlorine and from about 5% to about 65% by volume of pore space, evaporating the liquid from said mixture, and drying and recovering said so-treated resin.

2. A process as defined in claim 1 wherein the porous polymer is post-chlorinated polyvinyl chloride homopolymer.

3. A process as defined in claim 1 wherein the porous polymer is a post-chlorinated copolymer of not less than about 95% by weight of vinyl chloride and up to 5% by weight of a polymerizable monoolefinic comonomer.

4. A process as defined in claim 3 wherein the comonomer is vinyl acetate.

5. A process as defined in claim 1 wherein the amount of salt of phosphoric acid in said solution is in the range of about 0.25 part to about 10.0 parts by weight, based on the weight of 100 parts of said solution.

6. A process as defined in claim 1 wherein a surfactant is employed in said solution in the range of about 0.0005 part to about 0.005 part by weight, based on the weight of 100 parts of said solution.

7. A process as defined in claim 1 wherein the salt of phosphoric acid is disodium hydrogen phosphate.

8. A process as defined in claim 1 wherein the salt of phosphoric acid is sodium pysophosphate.

9. A process as defined in claim 6 wherein the surfactant is sodium lauryl sulfate.

10. A process as defined in claim 1 wherein the porous post-chlorinated polyvinyl chloride has a density in the range of about 1.52 to about 1.61 grams/cc. at 25° C. and a chlorine content in the range of about 65% to about 70% by weight.

11. A process as defined in claim 5 wherein the porous polymer is post-chlorinated polyvinyl chloride homopolymer.

12. A process as defined in claim 11 wherein the porous polymer contains from about 5% to about 65% by volume of pore space.

13. A process as defined in claim 12 wherein the salt of phosphoric acid is disodium hydrogen phosphate.

14. A process as defined in claim 13 wherein sodium lauryl sulfate is employed in said aqueous solution.

15. A process as defined in claim 14 wherein the porous post-chlorinated polyvinyl chloride homopolymer has a density in the range of about 1.54 to about 1.59 grams/cc. at 25° C. and a chlorine content in the range of about 65.3% to about 68.5% by weight.

* * * * *